US008720646B2

(12) United States Patent　　　(10) Patent No.: US 8,720,646 B2
Schlipf　　　(45) Date of Patent: May 13, 2014

(54) TREESTAND BOW HOLDER AND RELATED METHOD OF USE

(71) Applicant: Oak Leaf Outdoors, Inc., Brimfield, IL (US)

(72) Inventor: Jared S. Schlipf, Dunlap, IL (US)

(73) Assignee: Oak Leaf Outdoors, Inc., Brimfield, IL (US)

( * ) Notice: Subject to any disclaimer, the term of this patent is extended or adjusted under 35 U.S.C. 154(b) by 0 days.

(21) Appl. No.: 13/837,608

(22) Filed: Mar. 15, 2013

(65) Prior Publication Data

US 2013/0199875 A1　　Aug. 8, 2013

Related U.S. Application Data

(62) Division of application No. 13/342,671, filed on Jan. 3, 2012, now Pat. No. 8,424,645.

(60) Provisional application No. 61/430,425, filed on Jan. 6, 2011.

(51) Int. Cl.
*A01M 31/02*　　(2006.01)
*E04G 3/00*　　(2006.01)

(52) U.S. Cl.
USPC ........................................ 182/187; 248/218.4

(58) Field of Classification Search
USPC ................. 182/187, 188, 135, 136, 116, 230; 248/218.4, 220.1; 42/94; 89/34.04; 124/86
See application file for complete search history.

(56) References Cited

U.S. PATENT DOCUMENTS

| 4,230,296 | A | * | 10/1980 | Staley et al. | 248/309.1 |
| 4,331,311 | A | * | 5/1982 | Russell | 248/176.1 |
| 4,360,179 | A | * | 11/1982 | Roberts | 248/126 |
| 4,582,165 | A | | 4/1986 | Latini | |
| 4,708,221 | A | | 11/1987 | Kubiak | |
| 4,729,363 | A | * | 3/1988 | Skyba | 124/23.1 |
| 4,936,415 | A | * | 6/1990 | Williams | 182/187 |
| 5,060,756 | A | | 10/1991 | D'Acquisto | |
| 5,186,276 | A | * | 2/1993 | Craig | 182/187 |
| 5,377,657 | A | | 1/1995 | Foster et al. | |
| 6,086,026 | A | * | 7/2000 | Pearce | 248/127 |
| 6,244,556 | B1 | * | 6/2001 | Carrillo et al. | 248/519 |
| 6,308,800 | B1 | * | 10/2001 | Graham, Jr. | 182/136 |
| 6,663,059 | B1 | | 12/2003 | Warren | |
| 7,717,232 | B2 | * | 5/2010 | Butcher | 182/178.3 |
| 7,882,931 | B2 | | 2/2011 | D'Acquisto | |

(Continued)

OTHER PUBLICATIONS

Lone Wolf Elite Hang on Tree Stand downloaded on Jan. 4, 2011 from http://www.bowhuntingstuff.com/product/LONE_WOLF_ELITE77035/Lone-Wolf-Elite-H....

*Primary Examiner* — Charles A Fox
*Assistant Examiner* — Kristine Florio
(74) *Attorney, Agent, or Firm* — Warner Norcross & Judd LLP

(57) ABSTRACT

A treestand including a support platform that defines a bow holder hole within which a cam post is located. The bow holder hole accommodates a cam and/or a limb of a compound archery bow inserted therein. The cam post projects at least partially through the cam while a limb of the compound archery bow rests on a forward edge of the bow holder and/or a forward edge of the support platform to generally support the compound archery bow in an upright position, ready for use by an archer. A related method of use also is provided.

10 Claims, 6 Drawing Sheets

(56) References Cited

U.S. PATENT DOCUMENTS

2005/0035249 A1* 2/2005 Busuito ......................... 248/215
2006/0272898 A1* 12/2006 Hovey et al. .................. 182/135
2010/0270105 A1 10/2010 Hovey et al.

* cited by examiner

TREESTAND BOW HOLDER AND RELATED METHOD OF USE

BACKGROUND OF THE INVENTION

The present invention relates to treestand bow holder, and more particularly, to a treestand bow holder adapted to hold a compound archery bow in a generally upright and ready configuration, and a related method of use.

Bowhunting has gained in popularity in the past two decades. Many bowhunters use an elevated treestand, which is typically mounted to a tree trunk a distance above the ground. A treestand generally offers a bowhunter an unobstructed and large field of view. A treestand also removes the bowhunter from the line of sight of game.

In many cases, a bowhunter may sit in a treestand for many hours. Given the amount of time on the stand, most bowhunters prefer to have a way to hold their bow within reach, yet not necessarily in their hand. Accordingly, a variety of bow holders have been designed for treestands.

One type of bow holder includes a clamp that clamps three parallel rods to an exterior portion or perimeter of the treestand. The user inserts a limb of the bow between a pair of the rods and a single rod. The rods effectively wedge against and trap the bow limb to hold the bow in a fixed position. Although this holder can hold a bow, it presents shortcomings because it projects externally relative to the stand, and can be dislodged in some cases, particularly where the bowhunter moves around a lot on the platform, or as a bowhunter climbs onto the treestand. Further, although this bow holder works well with older style bows having vertical limbs, that is, limbs that are more aligned vertically with a riser of the bow, it typically does not work with parallel limb bows, which include limbs that sweep back from the riser and are generally parallel to one another, because the limbs do not fit within the hole. Moreover, when inserted in the hole, the parallel limbs orient the bow at an extreme angle so that the bow is difficult to grasp. Indeed, in most cases, the above bow holders angle the parallel limb bows significantly rearward toward the bowhunter, in an awkward position, usually preventing the bowhunter from sitting on a seat of the treestand.

Another type of bow holder is included in a treestand platform. A hole is defined in the platform. A limb of the bow is inserted through the hole, and basically through the platform so that a lower surface of the limb engages an upper front portion of the hole, located in the top of the platform, and an upper surface of the limb engages a lower rear portion of the hole located on the underside of the platform.

Accordingly, there remains room for improvement in the field of bow holders, particularly for compound archery bows.

SUMMARY OF THE INVENTION

A treestand is provided including a support platform that defines a bow holder hole within which a cam post is located. The bow holder hole is adapted to accommodate a cam and/or a limb of a compound archery bow inserted therein. The cam post projects at least partially through the cam while a limb of the compound archery bow rests on a forward edge of the bow holder and/or a forward edge of the support platform to generally support the compound archery bow in an upright position, ready for use by an archer.

In one embodiment, the support platform defines the bow holder hole and the bow holder hole defines a longitudinal axis that projects rearwardly from a forward support edge of the bow holder hole generally toward a rear edge of the support platform. A cam post can project laterally inwardly toward the longitudinal axis. Optionally, the cam post can be located entirely within the bow holder hole.

In another embodiment, the cam post includes a free end that is adapted to fit through a hole defined by a cam on a compound archery bow. The cam post and forward support edge of the bow holder hole and/or front edge of the support platform can engage the bow, and in particular, the post can engage an interior surface of the cam hole while the forward support edge and/or front edge can engage the lower surface of the lower limb of the compound archery bow to hold the archery bow in a generally upright position.

In yet another embodiment, the lower limb of the archery bow remains substantially entirely above at least one of the upper surface and lower surface of the support platform, without the lower limb projecting into and/or completely through the bow holder hole.

In still yet another embodiment, a method of using the treestand is provided in which a compound archery bow, for example, a parallel limb compound archery bow including upper and lower limbs that extend more rearwardly than upwardly and downwardly respectively, from a riser is provided. The lower limb includes a lower surface, and the lower limb is joined with a cam defining a cam hole. The compound archery bow is positioned above an upper surface of a support platform of the treestand. The support platform defines a bow holder hole bounded by a forward support edge and/or a forward support wall. The bow holder defines a longitudinal axis that projects rearwardly from the forward support edge and/or forward support wall, generally toward a rear edge of the support platform. The support platform includes a cam post that projects toward the longitudinal axis. The compound archery bow is lowered downward toward the upper surface of the support platform so that the cam hole aligns with the cam post. The compound archery bow is moved toward the cam post so that the cam post inserts into the cam hole and the cam. The bow can be tilted so that the lower surface of the lower limb of the bow engages at least one of the forward support edge and the forward edge of the support platform, and so that the cam post engages the cam hole to support the compound archery bow in an upright position.

In a further embodiment, the lowering step includes lowering the cam into the bow holder hole a preselected distance so that the cam hole is aligned with the cam post. Optionally, the cam is moved laterally in the bow holder hole away from one side edge and toward the opposite side edge, as well as toward the cam post.

The treestand provided herein provides a bow holder, and a related method of use, that is simple, efficient and accommodates a variety of cammed compound archery bows. The bow holder is particularly well suited for effectively holding parallel limb compound archery bows in an upright position.

These and other objects, advantages and features of the invention will be more readily understood and appreciated by reference to the detailed description of the invention and the drawings.

DETAILED DESCRIPTION OF THE CURRENT EMBODIMENTS

I. Overview

Figure 1:
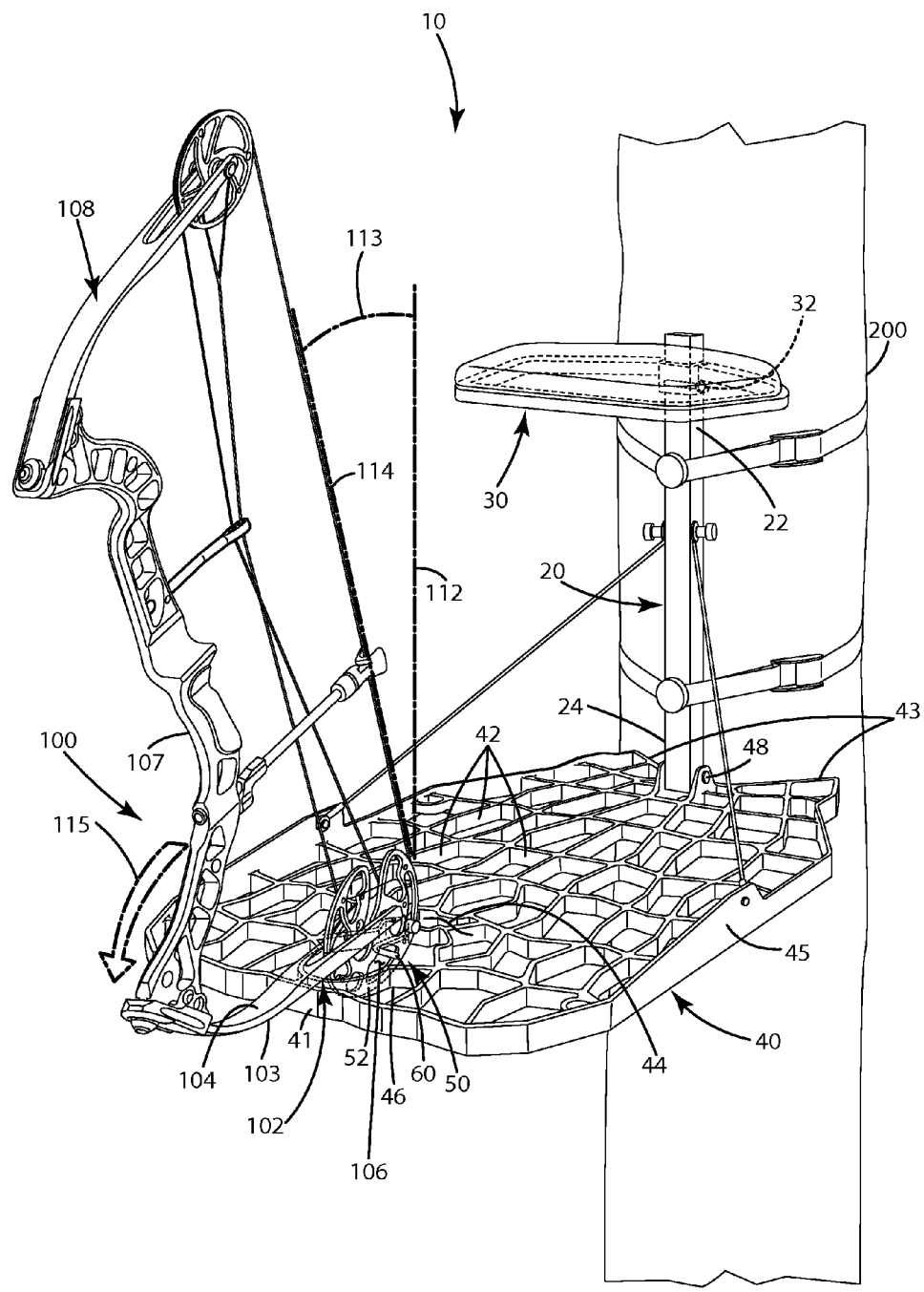
FIG. 1 is a first perspective view of a treestand of a current embodiment supporting a compound archery bow.

A treestand according to a current embodiment is illustrated in FIGS. 1-5 and generally designated 10. The treestand can be in the form of a portable hang-on treestand as illustrated including a post 20, a seat 30 joined with the post and a support platform 40 further joined with the post, opposite and generally below the seat. The support platform can define a bow holder hole 50 within which a cam post 60 projects, generally toward a longitudinal axis 51 defined by the bow holder hole 50. The cam post is configured to insert and register within a cam hole 106 defined by a cam 101 joined with a compound archery bow 100, which as illustrated, can be a parallel limb compound archery bow. The cam post engages the cam hole while the lower limb 102 of the bow engages at least one of a support edge 52 of the bow holder hole 50 and/or a front edge 41 of the support platform 40 to support the bow in a generally upright position as shown in FIG. 1.

Although the treestand shown is a portable hang-on treestand, unless otherwise specified, the term treestand can include climbing treestands, seatless support platforms, elevated platforms, platforms mounted on tripods or bipods, or other support structures that are adapted to maintain a hunter or user a preselected distance off the ground for purposes of hunting or viewing game.

Further, although the parallel limb compound bow embodiments illustrated include a dual cam system, the embodiments herein are well suited to accommodate parallel limb compound archery bows that include a cam and a half, or other compound archery bows including cams and/or pulleys. In addition, as used herein, a cam refers to a cam, a pulley and/or an eccentric, whether a module or integral part of a cam assembly used in connection with a compound bow.

Also, a parallel limb compound bow, as used herein, means an archery bow having an elongated riser that is generally longer than either of the upper or lower limbs, and where the upper and lower limbs are both rearwardly swept from the riser and have an appearance of being generally more horizontal than vertical when the riser is held in a substantially vertical orientation and the bow is viewed from the side. Generally, the limbs of a parallel limb bow can be disposed along at least a portion of their length, or along a substantial portion of their length, at an angle of optionally about 0° to about 55°, further optionally about 5° to about 40°, and further optionally about 10° to about 25° from a horizontal plane.

Finally, with reference to FIG. 1, when describing the bow as being supported in an upright position, this refers to a vertical axis 112, which is substantially orthogonal to the support platform 40, and a bow orientation axis 114, which is generally aligned in parallel with a bowstring of the bow and/or a riser of the bow, being disposed at an angle 113 relative to one another. When in the upright position, that angle 113 optionally can be between about 0° and about 45°, further optionally between about 0° and about 30°; even further optionally between about 0° and about 20°, and yet even further optionally between about 0° and about 10°. Generally, with this type of upright orientation, a user on the treestand can sit comfortably with the archery bow within easy reach, located generally forwardly and/or laterally of the user. Optionally, the archery bow will tilt slightly forward, yet still be located between the user's legs.

II. Construction

Referring to FIGS. 1-5, the treestand 10 will be described in more detail. As shown in FIG. 1, the treestand 10 includes an elongated post 20, a seat 30 and a support platform 40, where the platform defines a bow holder hole 50.

The elongated post 20 can include an upper end 22 and a lower end 24. The post can be a single bar or multiple bars that are generally adapted to be positioned adjacent a support structure 200, such as a tree, post or other element. The post 20 can be attached with conventional elements, such as straps, to the support structure 200. Optionally, in cases where the treestand is a freestanding platform mounted, for example, to a bipod or tripod, the post and seat can be eliminated if desired.

The upper end 22 of the post 20 can be connected to the seat 30. These elements can be connected in a fixed manner or with a pivot element 32 which can be a bolt or pin so that the seat can pivot from the generally horizontal position (as shown) to an upright position for storing or carrying the treestand 10. Generally, the seat forms a sitting area for a user to sit on. The lower end 24 of the elongated post 20 can be joined in a fixed and/or pivoting manner with the support platform 40. This joining can be achieved by a connection element 48, which can be a fastener, such as a bolt or pin. Optionally, the post 20 can be connected with the platform so that the platform 40 rotates about a pivot axis about element 48 relative to the elongated post from a generally horizontal and/or extended position in which the platform is substantially horizontal, as shown in FIG. 1, to a retracted position, in which the platform is positioned in a retracted position adjacent the elongated post for transport.

As shown in FIGS. 1-4, the support platform 40 includes a front edge 41, a rear edge 43 and opposing side edges 45. Generally, these opposing side edges join the front and rear edges. The support platform 44 can also define multiple holes 42 that generally lighten the weight of the treestand. The support platform can further define an upper surface 44 generally upon which the user stands, and a lower surface 46 which is located on the underside of the platform. The upper surface 44 generally lies in and forms a first plane which can be substantially horizontal when the platform is in an extended position. Optionally, the upper surface 40 is generally void of any protrusions that extend excessively upward to avoid tripping hazards. Further optionally, the bow holder hole 50 and other bow holder components described herein are located entirely below the upper surface 44 of the support platform so that no tripping hazards are presented to a user standing on the platform 40.

The treestand can be constructed from a variety of materials, such as aluminum, magnesium, steel, composites, polymers or other materials. Further, although shown as a cast or molded treestand, the treestands can be constructed from multiple components welded or other joined together if desired.

Figure 2:
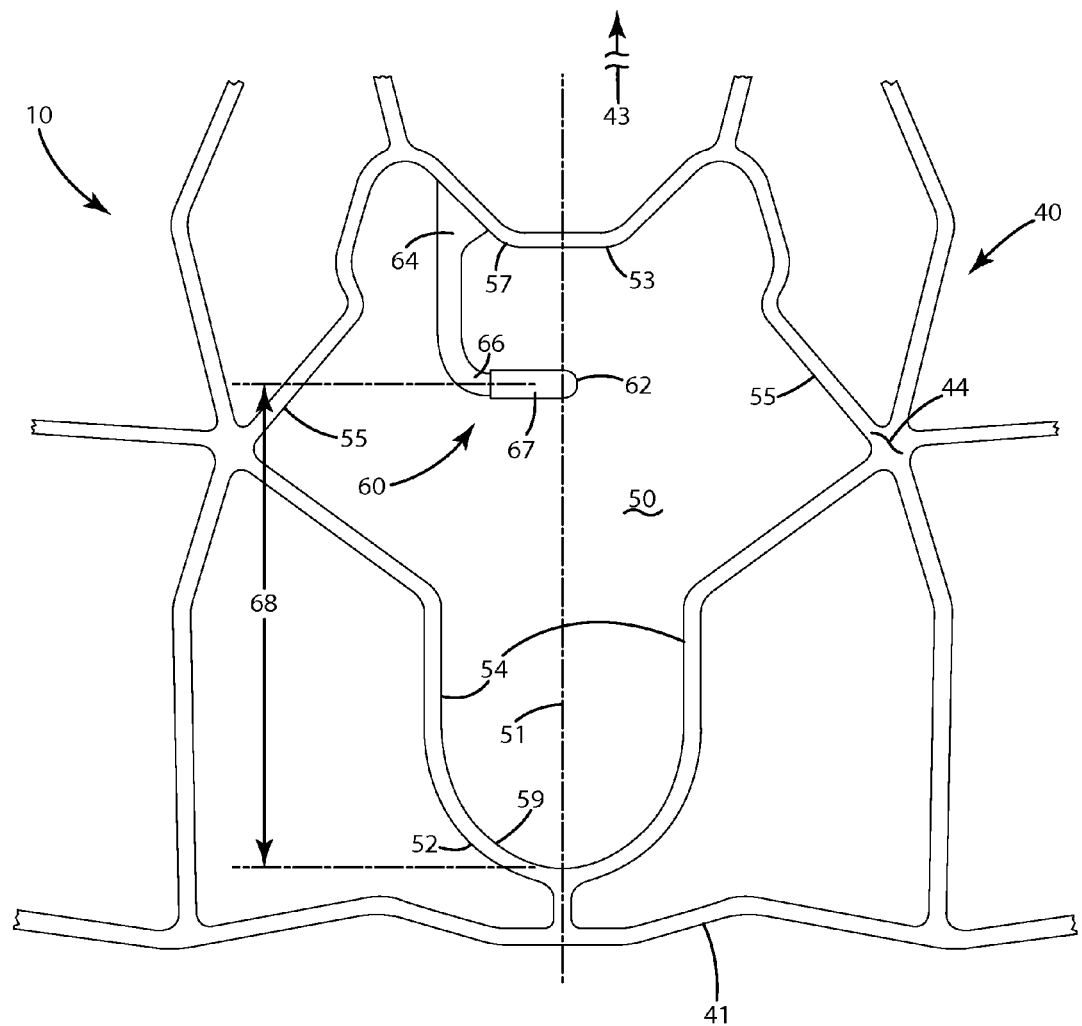
FIG. 2 is a top view of a portion of a support platform of the treestand.
Figure 6:
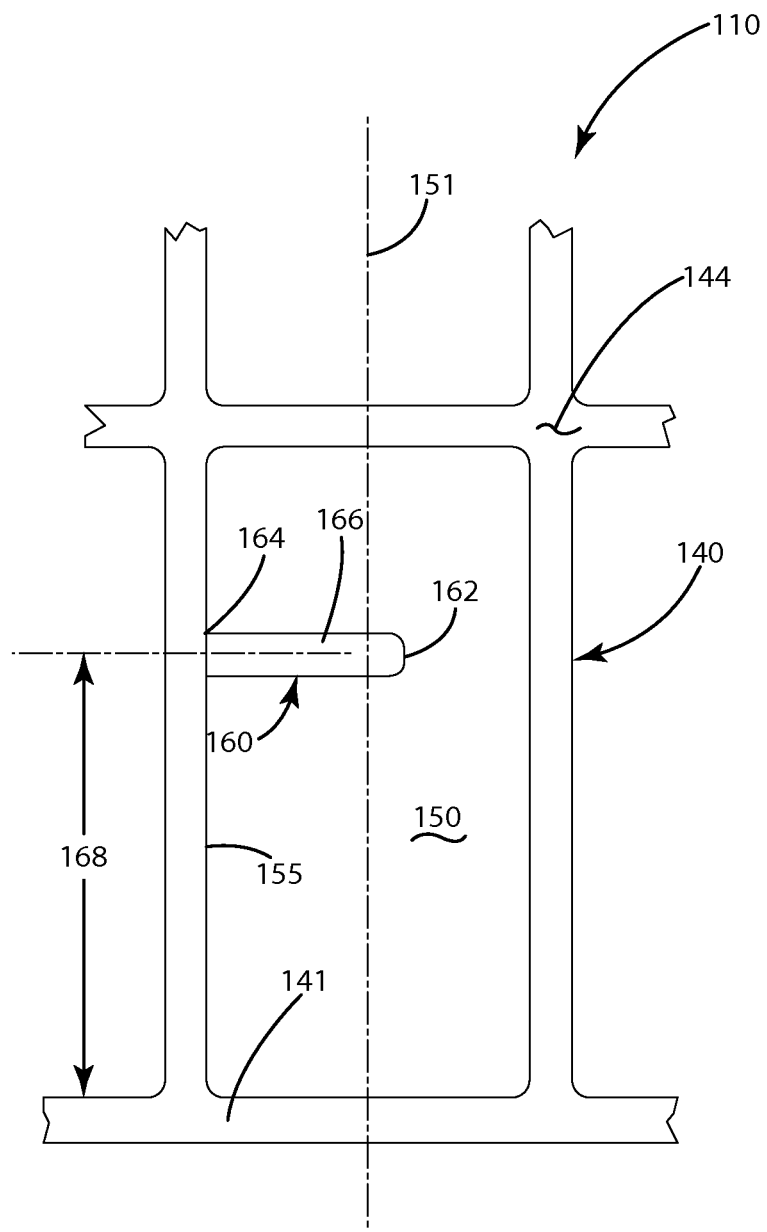
FIG. 6 is a first alternative embodiment of a treestand including a bow holder.

The support platform 40 as shown in FIG. 2 defines a bow holder hole 50 bounded by a forward support edge 52, opposing bow holder side edges 54 that extend rearwardly from the forward support edge 52, and a rearward edge 53 which is joined with the side edges 54. Although shown as separate and distinct edges 52, 53 and 54, all these edges can be generally continuous. Further, although shown in the form of an aesthetic wolf head, the geometric shape of the bow holder hole 50 can take on a variety of configurations. For example, it can be square, circular, elliptical, trapezoidal, rectangular, parabolic or virtually any other geometric shape. An example of an alternative bow holder hole in a rectangular shape is shown in FIG. 6, which is described in detail below.

The bow holder hole 50 also can define a longitudinal axis 51 that projects rearwardly from the forward support edge 52 generally toward the rear edge 43 of the support platform 40. As shown, this longitudinal axis 51 optionally can bisect the bow holder hole 50. Optionally, the longitudinal axis also can form a center line of the hole 50 with opposing sides of the bow holder hole being symmetric about that longitudinal axis 51. Alternatively, it can be offset from the center of the bow holder hole 50 a predetermined distance and/or at an angle. Further optionally, the longitudinal axis 51 can be aligned in parallel with a centerline 47 of the support platform 40 which generally dissects the platform. Of course, the longitudinal axis and the bow holder itself can be located in other portions of the support platform, for example, closer to the opposing side edges and/or rear edge. As shown, the bow holder hole and its edges can be distal from the opposing side edges of the support platform, but alternately could be located proximal those side edges.

A cam post 60 projects within the bow holder hole 50. The cam post 60 can extend from one or more of the side walls 55 or the rear wall 57 or the forward wall 59 of the bow holder hole 50. As shown, it projects from the rearward wall 57. In particular, the cam post 60 can include an attachment end 64 that is joined with the rear wall 57. The attachment end can project forwardly, generally parallel to the longitudinal axis 51. The attachment end 64 can transition to a central portion 66 which can include a curvilinear and/or angled portion. The central portion 66 can further transition to a free end 62. As shown the free end 62 can be generally perpendicular to the longitudinal axis 51.

The cam post free end 62 can be of a variety of geometric cross sections. As shown, it is generally cylindrical and of a diameter of about c, ¼, or ½ inches. Of course, other diameters can be selected as well as other geometric cross sections for the free end 62, as well as the other portions of the cam post 60. The central portion 66 and free end 62 of the cam post 60 optionally can include a bumper 67. This bumper can be constructed from a different material from the remainder of the cam post and/or support platform. As an example, the bumper 67 can be constructed from an elastomeric material, such as a polymer, rubber, silicone or other material configured so that when it engages the cam and/or cam hole of the archery bow, it does not mare or damage the material or cause any excessive noise upon such engagement.

The cam post 60 and its components can be integrally molded with the respective wall of the bow holder hole. Alternatively, the cam post 60 can be in the form of a stud or bolt that is inserted through a hole or threaded into a hole defined by a wall of the support platform and can extend generally inwardly toward the longitudinal axis 51 of the bow holder hole 50.

As shown, the cam post 60 optionally can be substantially L-shaped with the attachment end 64 joined with the bow holder rear wall 67. The "corner" of the "L" can be formed at least in part by the central portion 66. The free end 62 can form at least a portion of the lower part of the "L". The cam post central portion 66 and free end 62 can project laterally inwardly from the bow holder side wall 55 toward the longitudinal axis 51 of the bow holder hole.

As shown in more detail in FIG. 3, the cam post 60 can be located below the upper surface 44. Optionally, it is located entirely below the upper plane within which the upper surface 44 lies so as not to present a tripping hazard. Further optionally, the attachment end 64, free end 62 and/or central portion 66 can lie in a common post plane 61. This post plane can be substantially horizontal and/or substantially parallel to the upper surface 44 of the support platform and/or the plane in which the upper surface 44 lies.

Figure 3:
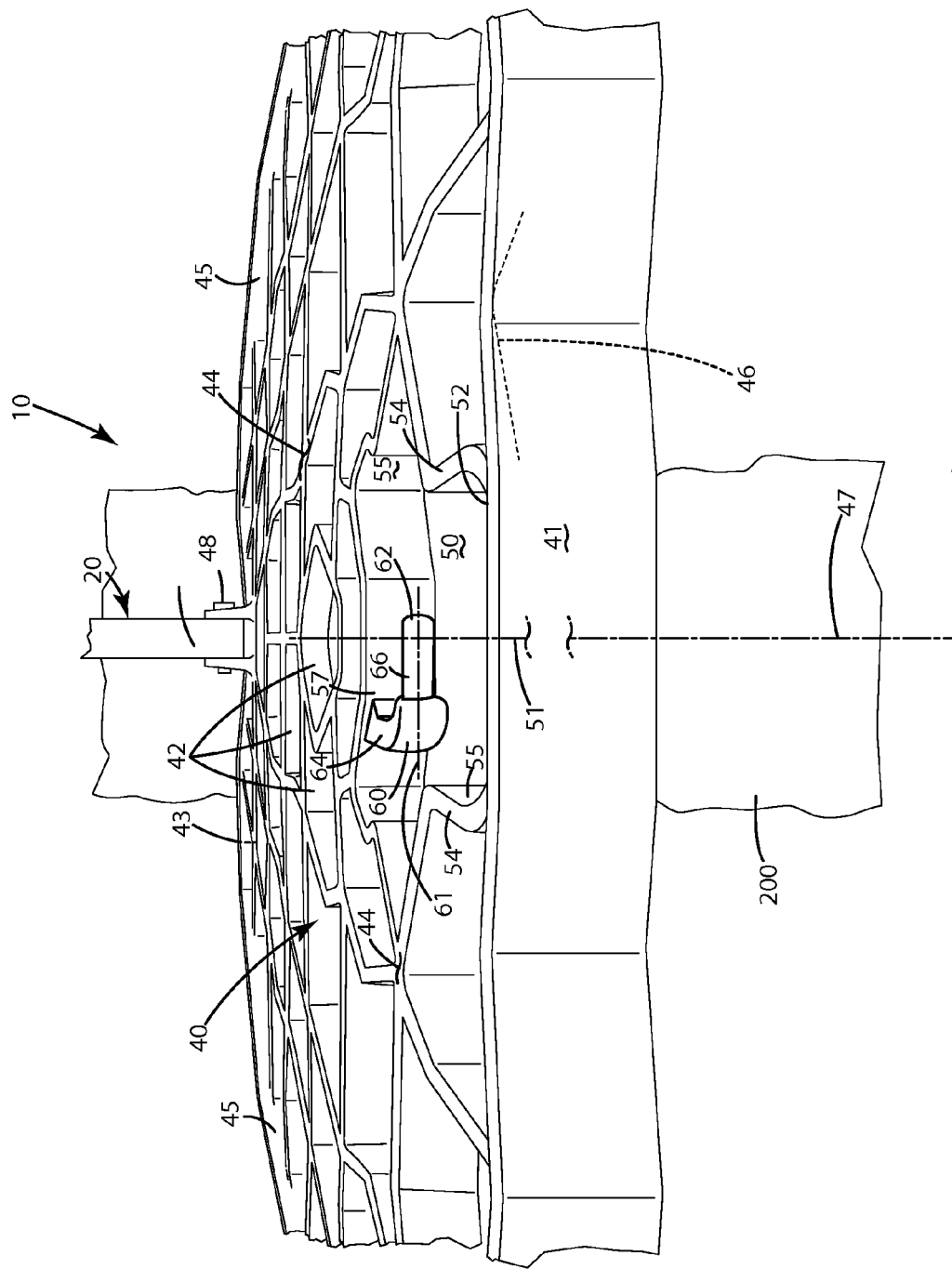
FIG. 3 is a front perspective view of the support platform.
Figure 4:
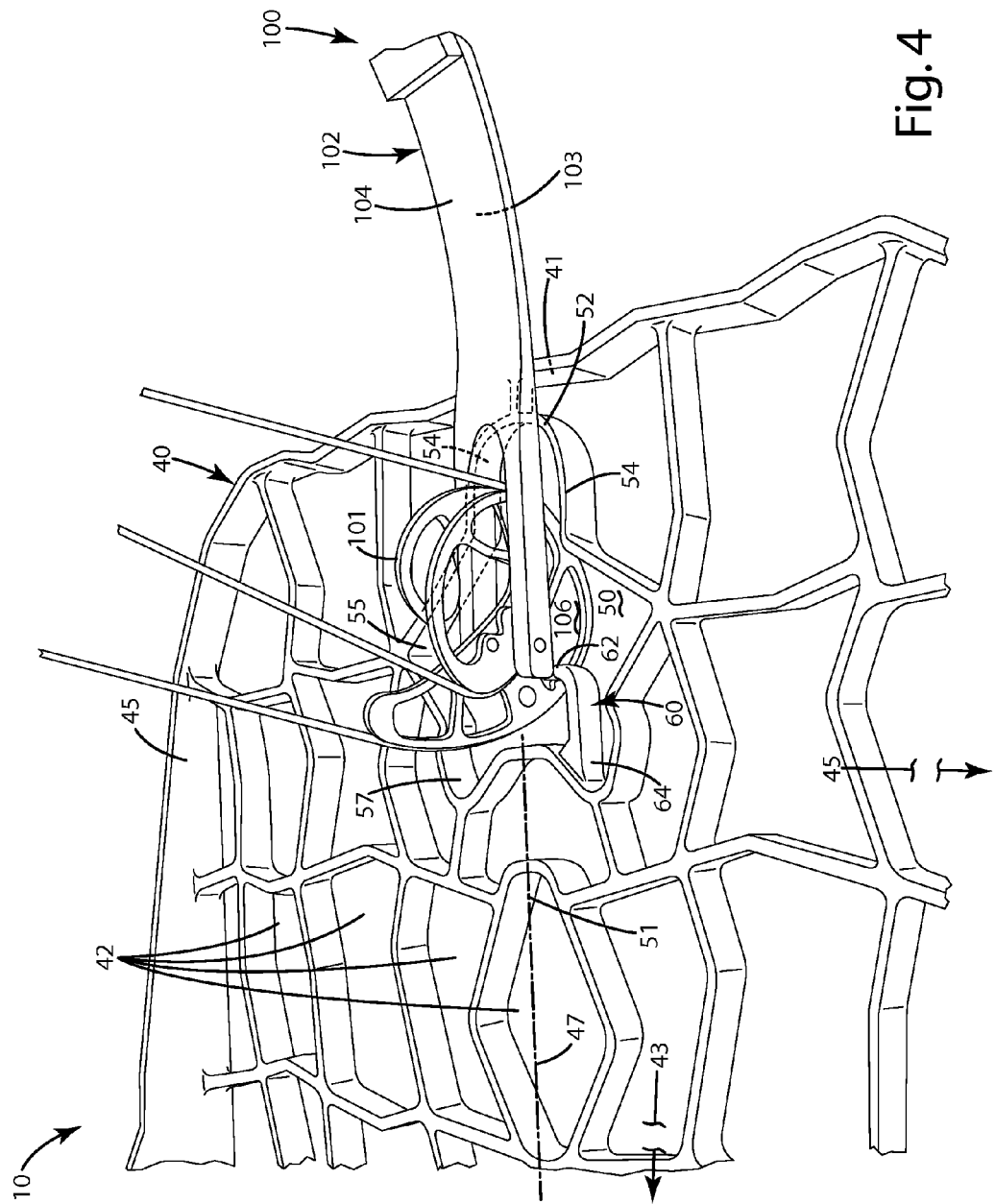
FIG. 4 is a side perspective view of the support platform with the compound archery bow engaged with a bow holder of the support platform.
Figure 5:
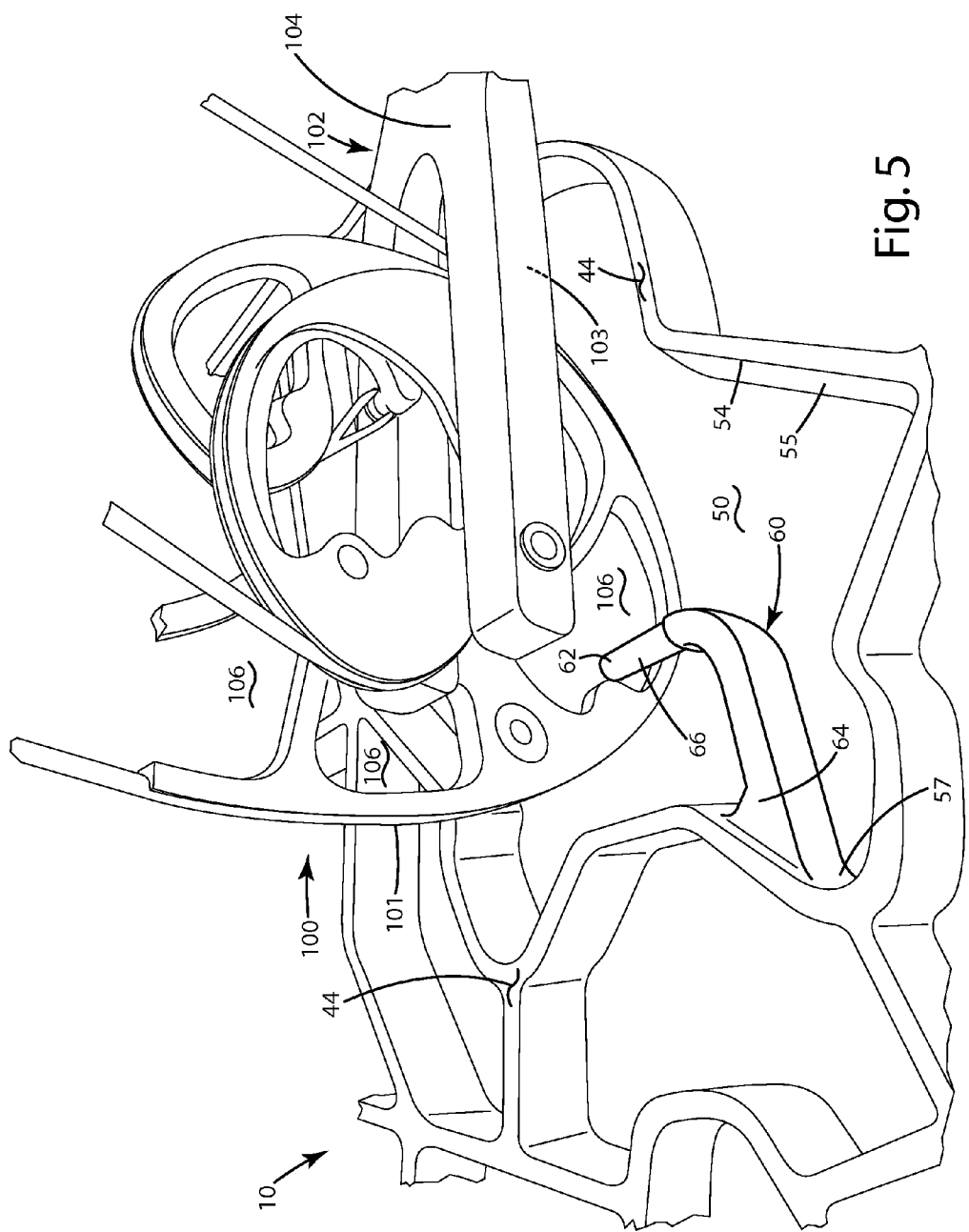
FIG. 5 is a close-up view of the bow holder engaging a compound archery bow.

As shown in FIGS. 3 and 4, the support platform 40 also can define a center line 47 which is generally aligned with the longitudinal axis 51 of the bow holder hole 50. In this case, the bow holder hole 50 can be generally disposed centrally from side edge 45 to opposing side edge 45 of the platform 40. With this construction, the bow holder hole 50 can orient and hold a bow in an upright position generally between the legs of a user seated on the treestand 10. Of course, if desired, the bow holder hole 50 can be offset from the center line 47 and oriented generally in a corner of the platform 40 formed by the front edge 41 and a side edge 45, or even further alternatively, along or adjacent a side edge 45 of the platform. Other configurations and locations of the bow holder are suitable as well.

The cam post 60, and in particular, the portion which engages the cam hole, for example the central portion 66 and/or the free end 62, can be positioned a preselected distance 68 from the forward support edge 52 of the bow holder hole 50. For example, as shown in FIG. 2, the preselected distance can be selected to accommodate and hold upright a parallel limb archery bow 100 as shown in FIG. 1. This preselected distance can be optionally about 2 inches, further optionally about 3 inches, even further optionally about 4 inches and yet even further optionally about 5 or more inches or any increment therebetween. The distance 68 can enable the cam post 60 to be located through a cam hole 106 while the lower surface 103 of a lower limb 102 engages at least one of the forward support edge 52 and/or the front edge 41 of the support platform 40.

Although referred to as a "support" edge herein, the forward support edge 52 need not necessarily always support the lower limb. For example, the forward support edge 52 can be lowered or even absent, so that the front edge 41 of the support platform, or some other support structure located rearward or forward of the front edge 41 of the structure can engage and/or support the lower limb 102 of the bow 100. Optionally, the forward support edge and/or the front edge or any other edge which the lower limb of the bow engages can be covered with or include a bumper to reduce noise and/or protect the limb from marring. The bumper can be constructed from any material, for example, an elastomer, polymer, foam, wood, fabric or any combination thereof. Moreover, as used herein, even when a bumper is included on such an edge, the lower limb still contacts, engages and/or is supported by such edge.

A first alternative embodiment of the treestand is shown in FIG. 6 and generally designated 110. This alternative embodiment is similar to the current embodiment described above with several exceptions. For example, the support platform 140 defines a bow holder hole 150 that is generally in the shape of a rectangle. The bow holder hole defines a longitudinal axis 151. The forwardmost portion of the bow holder hole 150 is bounded by a front edge 141 of the platform 140, and the forward support edge of the bow holder hole mentioned in the embodiment above is absent. Accordingly, a lower limb of a compound bow placed in the bow holder hole 150 engages the forward edge 141 of the support platform 140.

The cam post 160 in this embodiment also differs in that it is generally linear and extends in a substantially linear fashion toward the longitudinal axis 151. Optionally, the cam post can be substantially perpendicular to the longitudinal axis 151. In this embodiment, the cam post also can be located below the upper surface 144 of the support platform. The cam post can include an attachment end 164 which can be threaded into a corresponding threaded hole (not shown) in the side wall 155. Alternatively, it can be fastened with one or more nuts threaded on the post, welded or otherwise joined directly with the side wall 155 or other component of the platform. The cam post can also include a central portion 166 and a free end 162. The cam post 160 can likewise be positioned a preselected distance 168 from the forward edge 141 of the platform. This preselected distance can correspond to the distances recited above in connection with the embodiment above.

III. Method of Use

The treestand 10 of the embodiments described above can be used to hold and support a compound archery bow in a generally upright position as shown in FIG. 1. The treestand 10 is particularly well suited for parallel limb compound archery bows due to their geometric configuration and rearwardly sweeping limbs. In general, the method can include positioning a parallel limb compound archery bow above the upper surface 44 of the support platform 40. The parallel limb compound archery bow 100 can be lowered downward toward the upper surface 44 of the support platform 40. The cam 101 can be generally aligned and parallel with the longitudinal axis 51. Of course, it can be offset at an angle to the longitudinal axis if desired. The cam can be positioned proximal the axis so that the cam hole 106 aligns with the cam post 60 and so that the cam 101 dips downwardly into the bow holder hole 50, generally below the upper surface 44 of the support platform 40.

In another step, the bow 100, and more particularly the cam 101, can be moved laterally toward and/or away from the longitudinal axis 50 and/or one of the side edges 54 of the bow holder hole. The cam 101 can simultaneously move away from the other of the side edges 54 of the bow holder hole and/or the support platform. With this movement, the cam 101 generally moves toward the cam post 60. The bow 100 moves farther so that the free end 42 of the cam post 60 registers and inserts into the cam hole 106 until it projects a sufficient distance into the cam hole to engage an interior wall or portion of the cam surrounding the cam hole 106.

When the cam 101 is moved laterally toward the cam post 60 and the cam post 60 inserts into the cam hole 106, the cam post 60 can register within the cam hole 106 a predetermined distance, for example, about c, ¼, ½ or ¾ of an inch or more. The distance between the free end 42 and the side wall 55 toward which the cam post free end 62 points can be selected to provide enough clearance for cams of most conventional bows to fit between these elements rather easily, and/or for the user to withdraw the cam and bow from the bow holder easily.

In another step, the parallel limb compound archery bow 100 is tilted generally forwardly, away from the rear edge 43 of the platform until the lower surface 103 of the lower limb 102 engages at least one of the forward support edges 52 and/or the front edge 41 of support platform. Due to the weight of the bow, a fulcrum is presented at the point(s) of contact or engagement between the lower surface of the lower limb and the forward support surface 52 and/or the front edge 41 of the support platform. Accordingly, the bow rotates clockwise as shown with the arrow 115 in FIG. 1. However, because the cam post 60 is located within and engages the cam hole 106, this rotation is restricted. Of course, in situations where the bow 100 is more upright and a fulcrum is not formed, the lower surface of the archery bow can simply rest on the forward support edge and/or front edge of the support platform. In another case, the cam post 60 can engage the cam hole 106 and respective cam, while the forward support edge 52 and/or front edge 41, or some other structure located therebetween, engages the lower surface 103 of the lower limb 102. Cooperatively, engagement of these elements with the components of the archery bow support the bow 100 in the upright position as shown in FIG. 1.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A treestand comprising:
    an elongated post including an upper end and a lower end;
    a seat pivotally joined with the upper end of the elongated post, the seat configured to form a sitting area for a user to sit on, the seat configured to pivot upward about a seat pivot axis, and configured to pivot downward about the seat pivot axis to a substantially horizontal position, the seat configured to form a sitting area for a user to sit on in the substantially horizontal position; and
    a support platform joined with the lower end of the elongated post, the support platform defining a plurality of first holes that extend through the support platform substantially from an upper surface of the platform to a lower surface of the platform, the support platform joined with the elongated post, the platform configured to selectively pivot about a platform pivot axis from a retracted position adjacent the elongated post to an extended position in which the support platform is generally horizontal, the support platform configured to provide a standing area for the user to stand on when the support platform is in the extended position,
    wherein the support platform includes a front edge, a rear edge and opposing side edges joining the front and rear edges, the rear edge proximal the elongated post,
    wherein the support platform defines a bow holder hole bounded by a forward support edge with opposing bow holder side edges extending rearwardly from the forward support edge substantially toward the rear edge of the support platform, wherein the bow holder hole defines a longitudinal axis that projects rearwardly from the forward support edge substantially toward the rear edge of the support platform, wherein the support platform includes a cam post that projects inwardly toward the longitudinal axis, the cam post being located within the bow holder hole, the cam post including a free end and an attachment end with a central portion located therebetween, wherein the free end is substantially perpendicular to the longitudinal axis, wherein the free end is sized to fit through a cam hole defined by a cam on a parallel limb compound archery bow, wherein at least one of the central portion and free end is configured to engage the cam around the cam hole when the compound archery bow is placed at least partially in the bow holder hole, wherein at least one of the front edge and the forward support edge is configured to support a lower limb surface of the parallel limb compound archery bow when the compound archery bow is placed at least partially in the bow holder hole, wherein at least one of the front edge and the forward support edge and cam post are configured to cooperatively hold the parallel limb compound archery bow in a substantially upright position forward of the rear edge of the platform, with the lower limb of the parallel limb compound archery bow remaining above the lower surface of the support platform, and without the lower limb projecting completely through the bow holder hole, wherein the cam post is substantially L-shaped, with the attachment end joined with a bow holder hole rear wall.

2. The treestand of claim 1 wherein the cam post central portion and free end project laterally inwardly from the bow holder side wall toward the longitudinal axis of the bow holder hole.

3. The treestand of claim 1 wherein the cam post central portion include a bumper element configured to engage the cam when the cam post is inserted into the cam hole.

4. The treestand of claim 3 wherein the bumper element is constructed from an elastomeric material.

5. A treestand comprising:
an elongated post including an upper end and a lower end;
a seat pivotally joined with the upper end of the elongated post, the seat configured to form a sitting area for a user to sit on, the seat configured to pivot upward about a seat pivot axis, and configured to pivot downward about the seat pivot axis to a substantially horizontal position, the seat configured to form a sitting area for a user to sit on in the substantially horizontal position; and
a support platform joined with the lower end of the elongated post, the support platform defining a plurality of first holes that extend through the support platform substantially from an upper surface of the platform to a lower surface of the platform, the support platform joined with the elongated post, the platform configured to selectively pivot about a platform pivot axis from a retracted position adjacent the elongated post to an extended position in which the support platform is generally horizontal, the support platform configured to provide a standing area for the user to stand on when the support platform is in the extended position,
wherein the support platform includes a front edge, a rear edge and opposing side edges joining the front and rear edges, the rear edge proximal the elongated post,
wherein the support platform defines a bow holder hole bounded by a forward support edge with opposing bow holder side edges extending rearwardly from the forward support edge substantially toward the rear edge of the support platform, wherein the bow holder hole defines a longitudinal axis that projects rearwardly from the forward support edge substantially toward the rear edge of the support platform, wherein the support platform includes a cam post that projects inwardly toward the longitudinal axis, the cam post being located within the bow holder hole, the cam post including a free end and an attachment end with a central portion located therebetween, wherein the free end is substantially perpendicular to the longitudinal axis, wherein the free end is sized to fit through a cam hole defined by a cam on a parallel limb compound archery bow, wherein at least one of the central portion and free end is configured to engage the cam around the cam hole when the compound archery bow is placed at least partially in the bow holder hole, wherein at least one of the front edge and the forward support edge is configured to support a lower limb surface of the parallel limb compound archery bow when the compound archery bow is placed at least partially in the bow holder hole, wherein at least one of the front edge and the forward support edge and cam post are configured to cooperatively hold the parallel limb compound archery bow in a substantially upright position forward of the rear edge of the platform, with the lower limb of the parallel limb compound archery bow remaining above the lower surface of the support platform, and without the lower limb projecting completely through the bow holder hole, wherein the cam post free end projects substantially only in a post plane that is substantially parallel to the upper surface of the support platform, with the free end projecting perpendicular to and traversing the longitudinal axis of the support platform, wherein the cam post is located between the upper surface and the lower surface of the support platform.

6. A treestand comprising:
an elongated post including an upper end and a lower end;
a seat pivotally joined with the upper end of the elongated post, the seat configured to form a sitting area for a user to sit on, the seat configured to pivot upward about a seat pivot axis, and configured to pivot downward about the seat pivot axis to a substantially horizontal position, the seat configured to form a sitting area for a user to sit on in the substantially horizontal position; and
a support platform joined with the lower end of the elongated post, the support platform defining a plurality of first holes that extend through the support platform substantially from an upper surface of the platform to a lower surface of the platform, the support platform joined with the elongated post, the platform configured to selectively pivot about a platform pivot axis from a retracted position adjacent the elongated post to an extended position in which the support platform is generally horizontal, the support platform configured to provide a standing area for the user to stand on when the support platform is in the extended position,
wherein the support platform includes a front edge, a rear edge and opposing side edges joining the front and rear edges, the rear edge proximal the elongated post,
wherein the support platform defines a bow holder hole bounded by a forward support edge with opposing bow holder side edges extending rearwardly from the forward support edge substantially toward the rear edge of the support platform, wherein the bow holder hole defines a longitudinal axis that projects rearwardly from the forward support edge substantially toward the rear edge of the support platform, wherein the support platform includes a cam post that projects inwardly toward the longitudinal axis, the cam post being located within the bow holder hole, the cam post including a free end and an attachment end with a central portion located therebetween, wherein the free end is substantially perpendicular to the longitudinal axis, wherein the free end is sized to fit through a cam hole defined by a cam on a parallel limb compound archery bow, wherein at least one of the central portion and free end is configured to engage the cam around the cam hole when the compound archery bow is placed at least partially in the bow holder hole, wherein at least one of the front edge and the forward support edge is configured to support a lower limb surface of the parallel limb compound archery bow when the compound archery bow is placed at least partially in the bow holder hole, wherein at least one of the front edge and the forward support edge and cam post are configured to cooperatively hold the parallel limb compound archery bow in a substantially upright position forward of the rear edge of the platform, with the lower limb of the parallel limb compound archery bow remaining above the lower surface of the support platform, and without the lower limb projecting completely through the bow holder hole, wherein the cam post attachment end extends forwardly toward the forward support edge, parallel to the longitudinal axis, wherein the central portion includes at least one of an angle and a bend so that the free end projects toward and is perpendicular to the longitudinal axis.

7. The treestand of claim 6 wherein the lower limb of the parallel limb compound archery bow remains substantially entirely above the upper surface of the support platform without the limb being disposed in the bow holder hole.

8. A treestand comprising:

a support platform configured to support a user standing thereon, the support platform defining a plurality of first holes that extend through the support platform substantially from an upper surface of the platform to a lower surface of the platform, the platform positionable in a substantially horizontal orientation, wherein the support platform includes a front edge, a rear edge and opposing side edges joining the front and rear edges, wherein the support platform defines a bow holder hole bounded by a forward support edge, wherein the bow holder hole defines a longitudinal axis that projects rearwardly from the forward support edge substantially toward the rear edge of the support platform, wherein the support platform includes a cam post that projects laterally inwardly toward the longitudinal axis, the cam post being located within the bow holder hole, the cam post including a free end and an attachment end with a central portion located therebetween, wherein the free end is substantially perpendicular to and extends toward the longitudinal axis, wherein the free end is configured to fit through a hole defined by a cam on a parallel limb compound archery bow, wherein the central portion is configured to engage the cam surrounding the cam hole when the parallel limb compound archery bow is placed at least partially in the bow holder hole, wherein at least one of the forward support edge and the front edge is configured to be placed adjacent and support a lower limb surface of the parallel limb compound archery bow when the compound archery bow is placed at least partially in the bow holder hole, wherein the cam post and at least one of the forward support edge and the front edge are configured to cooperatively hold the parallel limb compound archery bow in a substantially upright position forward of the rear edge of the platform, with the lower limb of the parallel limb compound archery bow remaining substantially above the lower surface of the support platform, and without the lower limb projecting completely through the bow holder hole, wherein the cam post is of an L-shape, with the L-shape laying substantially entirely in a plane that is horizontal.

9. A treestand comprising:

a support platform configured to support a user standing thereon, the support platform defining a plurality of first holes that extend through the support platform substantially from an upper surface of the platform to a lower surface of the platform, the platform positionable in a substantially horizontal orientation, wherein the support platform includes a front edge, a rear edge and opposing side edges joining the front and rear edges, wherein the support platform defines a bow holder hole bounded by a forward support edge, wherein the bow holder hole defines a longitudinal axis that projects rearwardly from the forward support edge substantially toward the rear edge of the support platform, wherein the support platform includes a cam post that projects laterally inwardly toward the longitudinal axis, the cam post being located within the bow holder hole, the cam post including a free end and an attachment end with a central portion located therebetween, wherein the free end is substantially perpendicular to and extends toward the longitudinal axis, wherein the free end is configured to fit through a hole defined by a cam on a parallel limb compound archery bow, wherein the central portion is configured to engage the cam surrounding the cam hole when the parallel limb compound archery bow is placed at least partially in the bow holder hole, wherein at least one of the forward support edge and the front edge is configured to be placed adjacent and support a lower limb surface of the parallel limb compound archery bow when the compound archery bow is placed at least partially in the bow holder hole, wherein the cam post and at least one of the forward support edge and the front edge are configured to cooperatively hold the parallel limb compound archery bow in a substantially upright position forward of the rear edge of the platform, with the lower limb of the parallel limb compound archery bow remaining substantially above the lower surface of the support platform, and without the lower limb projecting completely through the bow holder hole, wherein the attachment end, central portion and free end are aligned along a straight line, wherein the cam post projects laterally inwardly from a side wall of the bow holder hole, and toward the longitudinal axis of the bow holder hole.

10. A treestand comprising:

a support platform configured to support a user standing thereon, the support platform defining a plurality of holes that extend through the support platform substantially from an upper surface of the platform to a lower surface of the platform, the platform positionable in a substantially horizontal orientation, wherein the support platform includes a front edge, a rear edge and opposing side edges joining the front and rear edges, wherein the support platform defines a bow holder hole bounded by a forward support edge, wherein the bow holder hole defines a longitudinal axis that projects rearwardly from the forward support edge substantially toward the rear edge of the support platform, wherein the support platform includes a cam post that projects toward the longitudinal axis, the cam post including a free end and an attachment end with a central portion located therebetween, wherein the free end inserts into a cam hole defined by a cam of a compound archery bow so that the cam post engages the cam, wherein at least one of the forward support edge and the front edge supports a lower limb surface of the compound archery bow when the compound archery bow is placed at least partially in the bow holder hole, wherein the cam post and the at least one of the forward support edge and the front edge cooperatively hold the compound archery bow in a substantially upright position forward of the rear edge of the platform, wherein the cam post is of an L-shape, with the L-shape laying substantially entirely in a plane that is horizontal.

* * * * *